United States Patent
Aoki

(10) Patent No.: US 8,780,259 B2
(45) Date of Patent: Jul. 15, 2014

(54) IMAGE CAPTURING APPARATUS AND IN-FOCUS POSITION DETECTION METHOD THEREOF

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/904,737

(22) Filed: May 29, 2013

(65) Prior Publication Data

US 2013/0258168 A1 Oct. 3, 2013

Related U.S. Application Data

(63) Continuation of application No. PCT/JP2011/076722, filed on Nov. 18, 2011.

(30) Foreign Application Priority Data

Nov. 30, 2010 (JP) ................................ 2010-267933

(51) Int. Cl.
*H04N 5/232* (2006.01)
(52) U.S. Cl.
USPC .................... 348/345; 348/222.1; 348/340
(58) Field of Classification Search
None
See application file for complete search history.

(56) References Cited

U.S. PATENT DOCUMENTS

| 4,914,282 A | 4/1990 | Akashi et al. | |
|---|---|---|---|
| 2008/0317454 A1* | 12/2008 | Onuki | 396/128 |
| 2011/0025904 A1* | 2/2011 | Onuki et al. | 348/360 |
| 2011/0109775 A1* | 5/2011 | Amano | 348/241 |
| 2011/0134310 A1* | 6/2011 | Kimura | 348/345 |
| 2012/0057057 A1* | 3/2012 | Amano | 348/294 |
| 2012/0092545 A1* | 4/2012 | Sugawara | 348/345 |
| 2013/0250164 A1* | 9/2013 | Aoki | 348/348 |

FOREIGN PATENT DOCUMENTS

| JP | 61-18912 A | 1/1986 |
|---|---|---|
| JP | 2002-258142 A | 9/2002 |
| JP | 2005-156900 A | 6/2005 |
| JP | 2009-8686 A | 1/2009 |
| JP | 2010-8443 A | 1/2010 |
| JP | 2010-91991 A | 4/2010 |
| JP | 2010-152161 A | 7/2010 |

* cited by examiner

*Primary Examiner* — Twyler Haskins
*Assistant Examiner* — Wesley J Chiu
(74) *Attorney, Agent, or Firm* — Birch, Stewart, Kolasch & Birch, LLP

(57) ABSTRACT

It is provided a image capturing apparatus including a control unit that determines whether to set a division number to a first division number n or to a second division number m which is larger than n based on the status of a subject, calculating a divided area evaluation curve by calculating a correlation between first detection information and second detection information for each of divided areas formed by dividing a phase difference detection area into the n or the m, and acquires a defocus amount to drive and control a focus lens to the in-focus position from a total evaluation curve obtained by conducting a required calculation processing on the divided area evaluation curves of the plural divided areas.

3 Claims, 14 Drawing Sheets

IMAGE CAPTURING APPARATUS AND IN-FOCUS POSITION DETECTION METHOD THEREOF

CROSS REFERENCE TO RELATED APPLICATION

This is a continuation of International Application No. PCT/JP2011/076722 filed on Nov. 18, 2011, and claims priority from Japanese Patent Application No. 2010-267933, filed on Nov. 30, 2010, the entire disclosures of which are incorporated herein by reference.

TECHNICAL FIELD

The present invention relates to an image capturing apparatus configured to detect a distance to a subject and perform a focal position control of a photographing lens and an in-focus position detection method of the image capturing apparatus.

BACKGROUND ART

As for an in-focus position detection method that detects a distance to a main subject, there is a contrast method or a phase difference auto focus ("AF") method. The phase difference AF method is frequently employed in a single lens reflex camera since it is capable of performing the in-focus position detection with high speed and high precision as compared to the contrast method.

A phase difference AF method employed in a conventional single lens reflex camera, for example, as disclosed in Patent Literature 1 below, is provided with two phase difference detection line sensors disposed at the left and the right sides separately from a solid state image capturing element that captures an image of a subject and detect a distance to a main subject based on a phase difference between the detection information of a first line sensor and the detection information of a second line sensor.

The phase difference AF method disclosed in the Patent Literature 1 has problems in that detection line sensors for use in detecting a phase difference are needed separately from a solid state image capturing element and, thus, the component costs and the manufacturing costs are increased, and further the size of the apparatus becomes larger.

Accordingly, as disclosed in Patent Literature 2 below, it has been proposed to install phase difference detection pixels on a light receiving surface of the solid state image capturing element. Since a solid state image capturing element formed with phase difference detection pixels is employed as for a solid state image capturing element that captures an image of a subject, an external phase difference detection sensor becomes unnecessary and cost reduction becomes enabled.

CITATION LIST

Patent Literature

Patent Literature 1: JP-A-2010-8443
Patent Literature 2: JP-A-2010-91991

SUMMARY OF INVENTION

Technical Problem

However, the conventional technology disclosed in Patent Literature 2 is aimed at a single lens reflex camera and premised on the installation of a large-sized solid state image capturing element. The phase difference detection pixels, as disclosed in Patent Literature 2, are configured to detect a phase difference by making the light-shielding film aperture of each of a pair of adjacent pixels small and positioning the light shielding film apertures to be offset towards the phase difference detection direction (generally left and right) in one side and the other side.

A large-sized (large area) solid state image capturing element in which each pixel has a large light receiving area is still capable of obtaining phase difference information with high speed and high precision even if the light shielding film aperture is reduced a little bit. However, in a solid state image capturing element in which the large light receiving area of each pixel is not large, and which is installed in, for example, a compact camera, the original light shielding film apertures are small. Therefore, if the phase difference information is obtained with high speed by setting the light shielding film aperture to be small and the light receiving time to be short, a problem occurs in that the precision of the phase difference information, that is, the precision of in-focus position detection is degraded depending on the status of the subject.

An object of the present invention is to provide an image capturing apparatus capable of calculating an in-focus position by acquiring phase difference information with high speed and high precision regardless of the status of the subject even when a solid state image capturing element of a small area is employed, and a method of detecting an in-focus position thereof.

Solution to Problem

An image capturing apparatus and an in-focus position detection method of the present invention is characterized in that the image capturing apparatus that includes an image capturing element where pair-pixels each configured by a first phase difference detection pixel and a second phase difference detection pixel that are pupil-divided are arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control means that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, in which the in-focus position detection method includes: determining whether to set a division number into which the phase difference detection area is divided in a direction perpendicular to the detection direction of the phase difference to a first division number n or to a second division number m which is larger than n based on the status of the subject, calculating a correlative operation curve for each divided area by calculating a correlation between the first detection information and the second detection information for each of the divided areas formed by dividing the phase difference detection area into the n or the m, and acquiring a defocus amount to drive and control the focus lens to the in-focus position from a total evaluation curve obtained by conducting a required calculation processing on the correlative operation curves of the plural divided areas.

Advantageous Effects of Invention

According to the present invention, even when a small solid state image capturing element is used, an AF operation performance equivalent to that of the single lens reflex camera with high speed and high precision may be obtained regardless of the status of the subject.

DESCRIPTION OF EMBODIMENTS

Hereinafter, descriptions of an embodiment of the present invention will be made referring to drawings.

Figure 1:
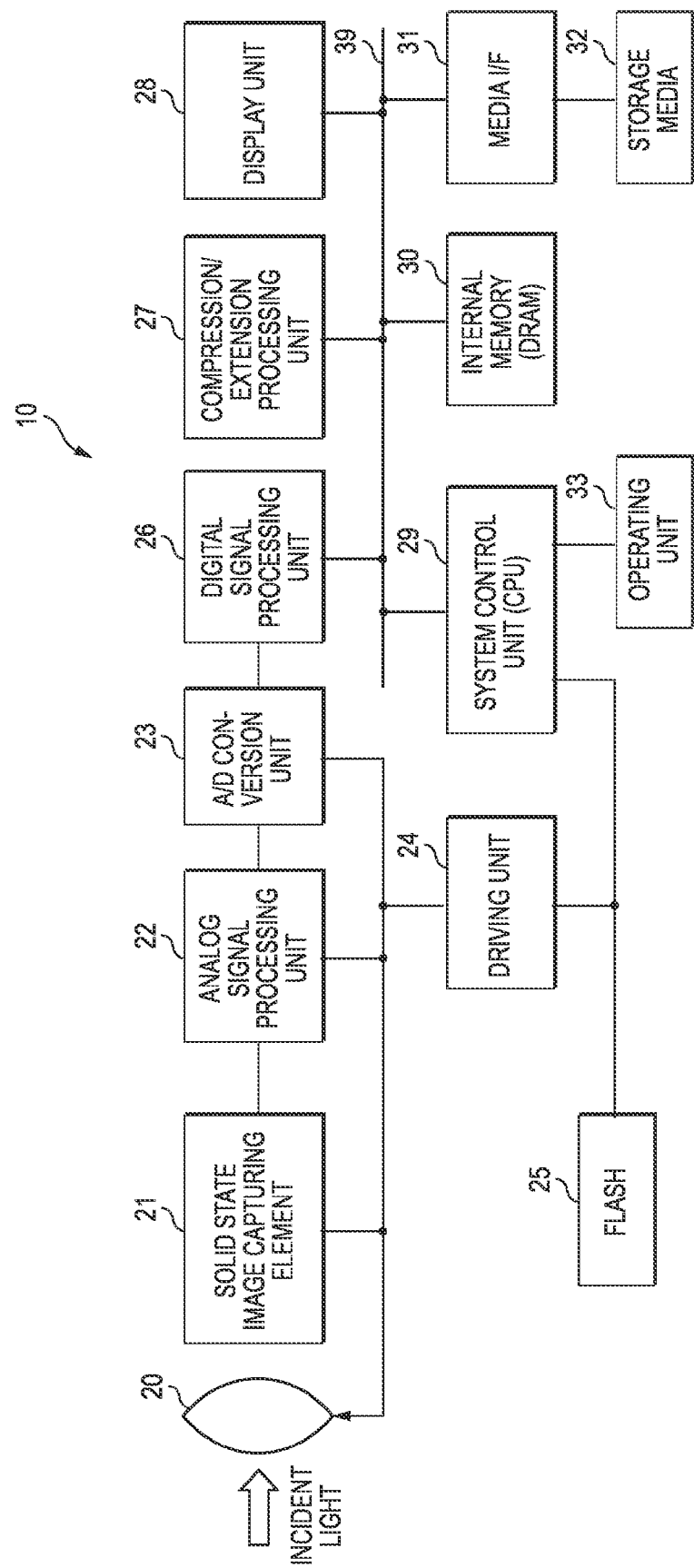
FIG. 1 is a functional block diagram of an image capturing apparatus according to an embodiment of the present invention.

FIG. 1 is a functional block diagram of a digital camera according to an embodiment of the present invention. A digital camera 10 of the present invention photographs a still image or a moving image of a subject and has a function that conducts a digital processing on a captured image signal inside the camera 10, in which the digital camera includes: a photographing lens 20 equipped with a telephoto lens and a focus lens; a solid state image capturing element 21 placed at the back of the photographing lens 20 and disposed on the image forming surface of the photographing lens; an analog signal processing unit 22 that performs an analog processing such as e.g., an automatic gain control ("AGC") or a correlative double sampling processing and the like on an analog image data output from the each pixel of the solid state image capturing element 21; an analog digital (A/D) conversion unit 23 that converts the analog image data output from the analog signal processing unit 22 to a digital image data; a driving unit 24 that drives and controls the A/D conversion unit 23, the analog signal processing unit 22, the solid state image capturing element 21, and the photographing lens 20 in response to a command from a system control unit ("CPU") 29 described down below; and a flash 25 emitting light in response to the command from the CPU 29.

The digital camera 10 of the present invention further includes: a digital signal processing unit 26 that conducts, for example, a interpolation processing or a white balance compensation, a RGB/YC conversion processing by obtaining the digital image data output from the A/D conversion unit 23; a compression/extension processing unit 27 that compresses or extends image data to image data of a JPEG format or the like; a display unit 28 that displays, for example, a menu and a through image or a captured image; a system control unit ("CPU") 29 that performs integrated control of the entire digital camera; am internal memory 30 such as, e.g., a frame memory, a media interface ("I/F") 31 that processes an interface between a storage media 32 storing, for example, JPEG image data and the media interface; and a bus 39 connecting all components described above. Also, an operating unit 33 where a command input from a user is conducted is connected to the system control unit 29.

The system control unit 29 interprets the captured image data (through image) output in a moving image state from the solid state image capturing element 21 and processed in the digital signal processing unit 26 as described below using an affiliate component thereof such as digital signal processing unit 26 so as to calculate an evaluation curve (correlative operation curve) and detect the distance to a main subject. In addition, the system control unit 29 performs a position control of the focus lens of the photographing lens 20 disposed at the front end of the light path of the solid state image capturing element 21 and causes an optical image that is in-focus on the subject to be formed on the light receiving surface of the solid state image capturing element 21 through a driving unit 24.

The solid state image capturing element 21 is a CMOS type in the present embodiment. Although an output signal of the solid state image capturing element 21 is processed in the analog signal processing unit (AFE: analog front end) 22, the AFE part (e.g., a circuit conducting a correlative double sampling processing or clamping, a signal amplification circuit performing a gain control) is usually installed as a peripheral circuit on a solid state image capturing element chip. Also, other circuits such as a horizontal deflection circuit, a vertical deflection circuit, a noise reduction circuit, and a synchronizing signal generation circuit are formed on the chip of solid state image capturing element 21 around a light receiving part as the peripheral circuit. In some cases, the A/D conversion unit 23 of FIG. 1 is also formed. Further, even if the solid state image capturing element 21 is a CCD type, an embodiment described below is applicable as it is.

Figure 2:
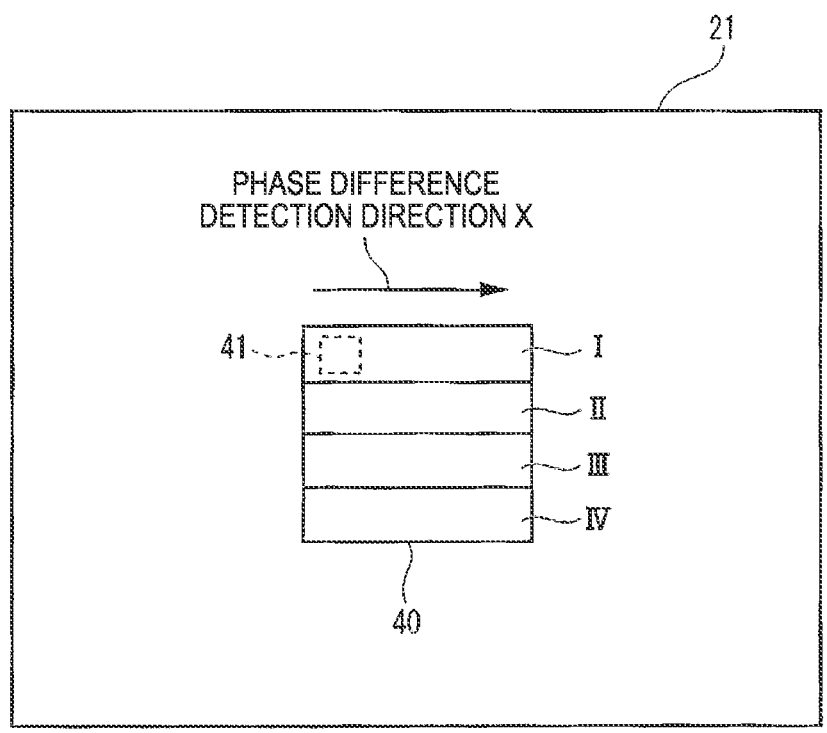
FIG. 2 is an explanatory view of a phase difference detection area provided on a light receiving surface of the solid state image capturing element illustrated in FIG. 1.

FIG. 2 is an explanatory view of the light receiving surface of the solid state image capturing element 21. A plurality of pixels (light receiving elements: photodiodes) not illustrated in the drawing are arranged and formed in a two-dimensional array on the light receiving surface of the solid state image capturing element 21. In the present embodiment, the plurality of pixels are arranged and formed in a square grid arrangement. Also, the pixel arrangement is not limited to the square grid arrangement and may be a so-called honeycomb pixel arrangement in which the pixel rows of even number rows are arranged to be offset by a 1/2 pixel pitch in relation to the pixel rows of odd number rows, respectively.

A rectangular-shaped phase difference detection area 40 is provided at a position of a partial area on the light receiving surface (at the central position in the illustrated example). Although only one phase difference detection area 40 is provided on the light receiving surface, a plurality of phase difference detection areas may be provided such that the AF is enabled anywhere in the photographing screen. The whole area of the light receiving surface may be used as the phase difference detection area.

In the present embodiment, it is characterized in that a case where the in-focus position to the subject is detected as described below by dividing the phase difference detection area 40 into four in the direction (up-and-down direction y) perpendicular to the phase difference detection direction (left-and-right direction, i.e., x direction is used as the phase difference detection direction in the present example) and a case where the in-focus position to the subject is detected as one area without dividing the phase difference detection area 40 are switched to each other based on the status of the subject. Also, the division number is not limited to 4 and it may be 6, 7 or any arbitrary number.

Figure 3:
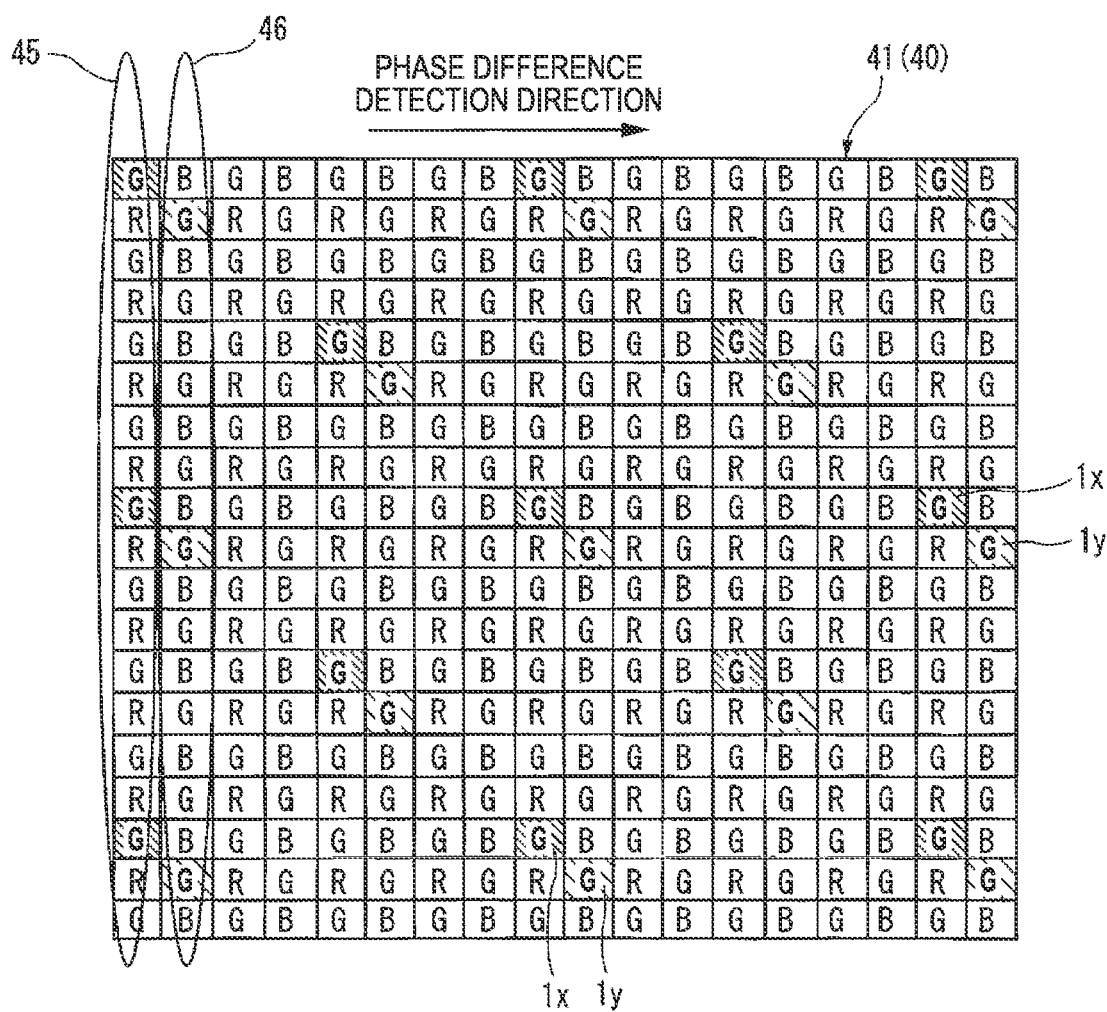
FIG. 3 is an enlarged schematic view of the surface within the dotted lined rectangular-shaped frame of FIG. 2.

FIG. 3 is an enlarged schematic view of the surface of the portion illustrated as a dotted lined rectangular-shaped frame 41 of FIG. 2 within the phase difference detection area 40. A plurality of pixels are arranged as a square grid arrangement on the light receiving surface of the solid state image capturing element 21 which is the same as for the phase difference detection area 40.

In the illustrated example, each pixel is indicated by R (red), G (green), or B (blue). R, G, and B indicate the colors of color filters stacked on pixels, respectively. Although a Bayer arrangement is exemplified in the present example, the arrangement of the color filters is not limited to the Bayer arrangement and it may be another color filter arrangement such as a stripe arrangement.

Although the pixel arrangement and the color filter arrangement within the phase difference detection area 40 are the same as those of the light receiving surface except for the phase difference detection area 40, paired pixels adjacent to each other obliquely within the phase difference detection area 40 are denoted by 1x and 1y, respectively. The pair-pixels for the phase difference detection purpose are provided at the discrete and periodic positions within the phase difference detection area 40 (at check positions in the illustrated embodiment).

Also, the color filter arrangement has the pixels of the same color adjacent to each other obliquely for the Bayer arrangement in the illustrated example. As for a horizontal stripe arrangement, two pixels forming a pair are adjacent to each other widthwise since the pixels of the same color are arranged in the horizontal direction. Alternatively, two pixels forming a pair may not be provided in a filter row of the same color in a horizontal stripe arrangement but may be separated from each other and respectively provided in the filter rows of the same color which are nearest to each other in the vertical direction. The same applies to a vertical stripe arrangement.

In the present embodiment, the phase difference detection pixels 1x, 1y are installed on G filter mounted pixels that are abundant the most among R, G, and B and arranged at intervals of eight pixels in the horizontal direction (x direction) and eight pixels in the vertical direction (y direction) and further to be located at check positions overall. Therefore, when viewed in the phase difference direction (horizontal direction), the phase difference detection pixels 1x are arranged at intervals of 4 pixels.

Figure 4:
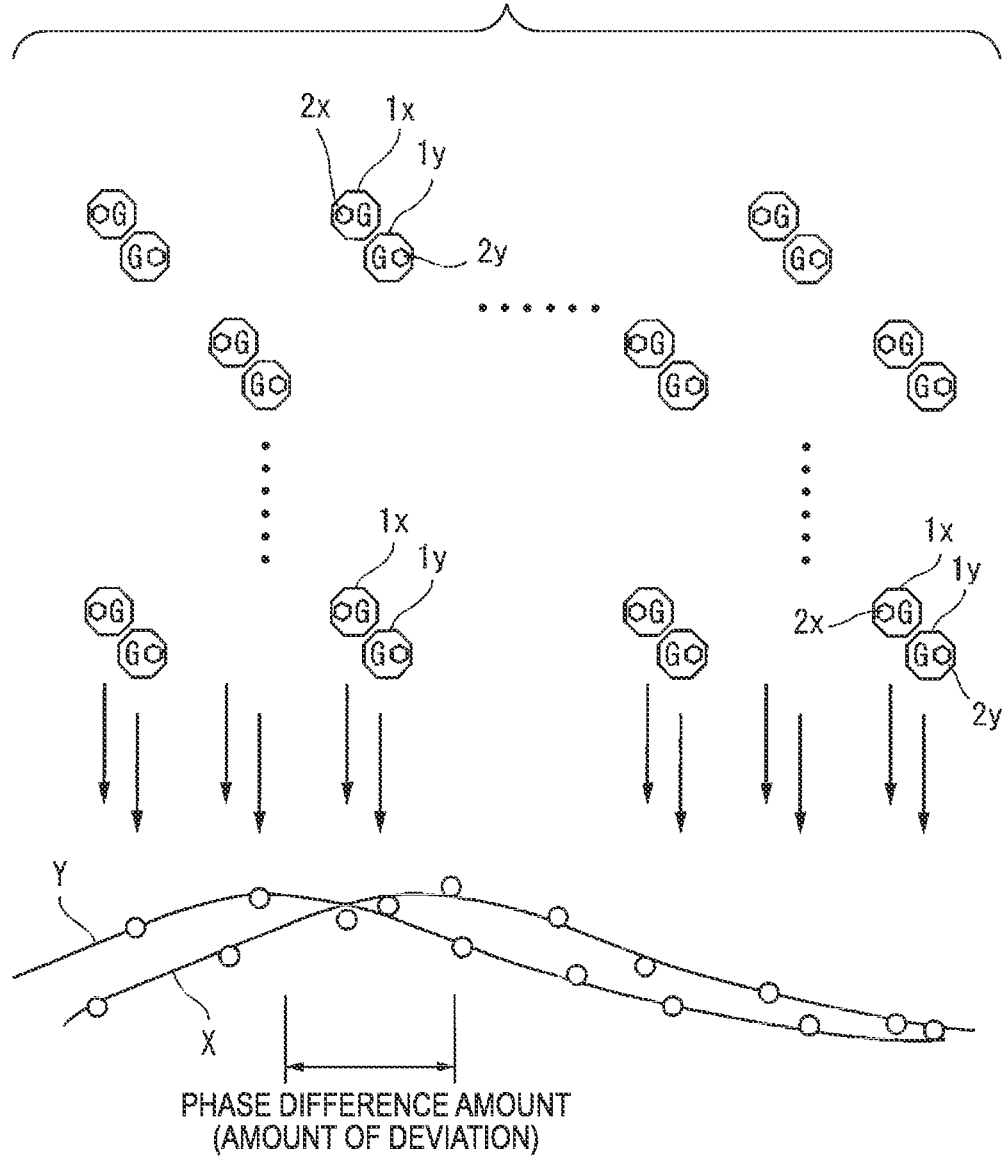
FIG. 4 is a view describing a concept of a phase difference amount obtained by extracting only the phase difference detection pixels of FIG. 3 and the detected signals of the phase difference detection pixels.

FIG. 4 is a view schematically illustrating only the phase difference detection pixels 1x, 1y extracted from FIG. 3. As for the phase difference detection pixels 1x, 1y which form the pair-pixel, the light shielding apertures 2x, 2y of the phase difference detection pixels are formed smaller than other pixels (pixels other than the phase difference detection pixels) as in Patent Literature 2. Also, the light shielding apertures 2x of the pixels 1x are provided eccentrically in the left direction and the light shielding apertures 2y of the pixels 1y are provided eccentrically in the right direction (phase difference direction).

The curve X illustrated at the lower part of FIG. 4 is a graph in which detection signal amounts of the phase difference detection pixels 1x aligned in one horizontal row are plotted and the curve Y is a graph in which detection signal amounts of the phase difference detection pixels 1y that form pairs with the pixels 1x are plotted.

It is believed that pixels in a pair-pixel 1x and 1y receive light from the same subject since they are adjacent pixels and very close to each other. For this reason, it is believed that the curve X and the curve Y become the same form and the deviation of the left-and-right direction (phase difference direction) becomes a phase difference amount between the image viewed at the pixel 1x of one side of the pupil-divided pair-pixel and the image viewed at the pixel 1y of another side.

By performing a correlative operation of the curve X and the curve Y, the phase difference amount (an amount of horizontal deviation) may be calculated and it becomes possible to calculate the distance to the subject based on the phase difference amount. As for a method of calculating an evaluation value of correlative amount of the curve X and the curve Y, a known method (for example, the method described in Patent Literature 1 or the method described in Patent Literature 2) may be employed. For example, an integrated value of an absolute value of the difference between each of the points X (i) that form the curve X and each of the points Y (i+j) that form the curve Y is set as an evaluation value and a value j that provides the maximum evaluation value is set as the phase difference amount (an amount of horizontal deviation).

However, in a case in which a light receiving area of each and every pixel is small, each signal amount becomes small and the ratio of the noise increases, and, thus, it becomes difficult to detect the phase difference precisely even if the correlative operation is performed. Therefore, if the signals detected from the pixels 1x which are on the same horizontal position are added for a plurality of pixels in the vertical direction and the signals detected from the pixels 1y which are on the same horizontal position are added for a plurality of pixels in the horizontal direction within the phase difference detection area 40 of FIG. 2, the influence of the noise is reduced and it becomes possible to enhance the detection precision (AF precision).

However, it is not always good to increase the number of pixels for pixel addition. When the number of pixels for pixel addition is increased, the arrangement area of the phase difference detection pixels that are the objects of pixel addition in the phase difference detection area 40 is extended in the vertical direction (perpendicular direction) as the number of pixels for pixel addition increases. As for a pattern of a subject, the pattern image captured at the upper part of the phase difference detection area 40, the pattern image captured at the middle part, and the pattern image captured at the lower part are usually different from each other. For this reason, if the phase difference detection area 40 is set as one area and the pixel addition is performed on the pixels thereof based on the status of the subject, there may be a case in which the evaluation value for calculating the phase difference decreases since the patterns of the subject after the pixel addition are equalized in the phase difference detection direction (horizontal direction).

Therefore, in the present embodiment, the phase difference detection area 40 is divided into four based on the status of the subject and the range of pixel addition is limited to the inside of each divided area so that the pixel addition is not performed beyond the divided area. That is, a divided area evaluation curve (correlative operation curve) is obtained by performing the pixel addition per each of the divided areas I, II, III, IV and a whole evaluation curve (total evaluation curve) of the phase difference detection area 40 is obtained by adding individual divided area evaluation curves.

Figure 5:
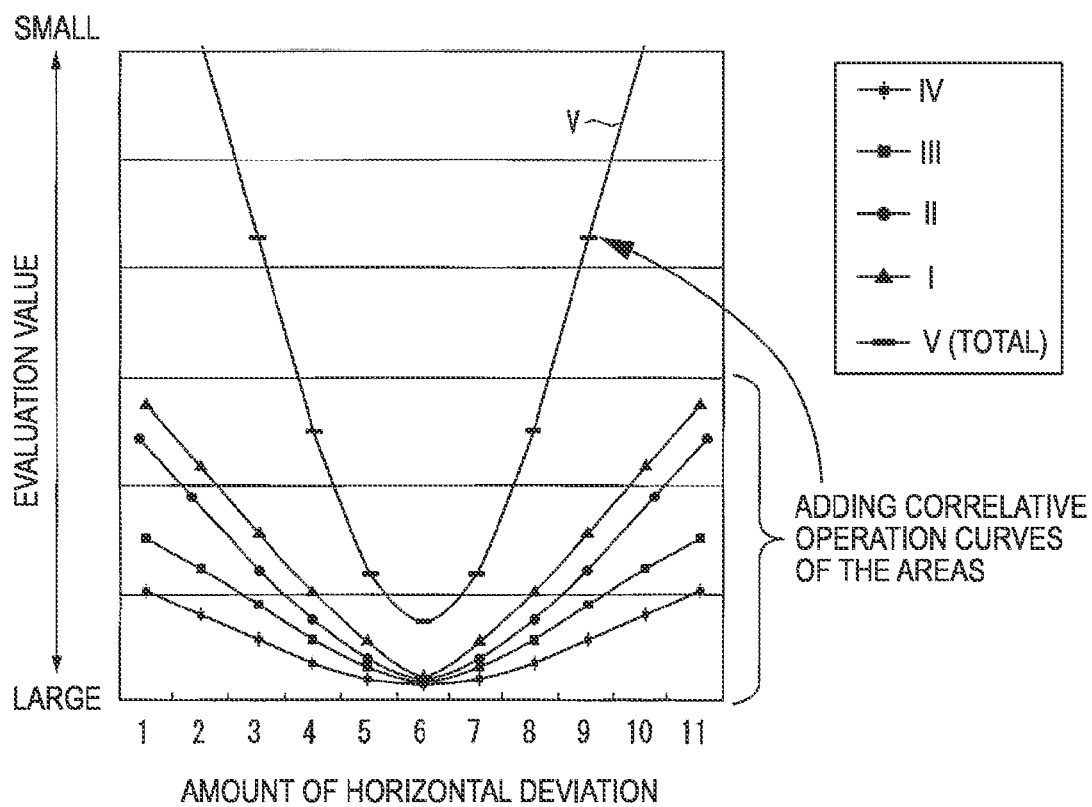
FIG. 5 is an explanatory view of an evaluation curve for each divided area and a summated evaluation curve.

FIG. 5 is a graph illustrating the divided area evaluation curves (correlative operation curves per divided area) I, II, III, IV and the total evaluation curve (evaluation curve of whole area) V obtained by adding the four divided area evaluation curves. The divided area evaluation curve I is obtained by performing the correlative operation on the curve X of FIG. 4 obtained by performing the pixel addition on the detection signals of the phase difference detection pixels 1x within the divided area I in the vertical direction (for example, symbol 45 of FIG. 3) and the curve Y of FIG. 4 obtained by performing the pixel addition on the detection signals of the phase difference detection pixels 1y within the divided area I in the vertical direction (for example, symbol 46 of FIG. 3) within the divided area. In this example, the maximum evaluation value is obtained as the minimum value.

Likewise, the divided area evaluation curve II is an evaluation curve obtained from the divided area II, the divided area evaluation curve III is an evaluation curve obtained from the divided area III, and the divided area evaluation curve IV is an evaluation curve obtained from the divided area IV.

Since the number of pixels for pixel addition to obtain each of the four evaluation curves I, II, III, IV for the four divided areas becomes substantially 1 over the number of divided areas for the pixel number of the phase difference detection pixels 1x arranged in the vertical direction of the phase difference detection area 40, it is less likely that the patterns of the subject are equalized and it becomes possible to calculate the evaluation value precisely.

Then, the phase difference amount (defocus amount) for adjusting the focus lens to the in-focus position is calculated by obtaining the total evaluation curve V by summating the four divided area evaluation curves I, II, III, IV and further performing a sub-pixel interpolation in the total evaluation curve V. Accordingly, it becomes possible to perform the highly precise calculation of the phase difference which is robust to noise while maintaining the evaluation value of each of the divided areas of the subject.

In FIG. 5, since one unit of the axis of abscissas is the pixel interval of the phase difference detection pixels of FIG. 3 (since it is a check arrangement at intervals of eight pixels, it becomes an interval of 4 pixels), a position that provides the true minimum value (the maximum evaluation value), that is, the phase difference amount is calculated by performing the sub-pixel interpolation considering, for example, the position of the minimum value of the total evaluation curve V and each slope of a curve extending to the right side and a curve extending to the left side for the minimum value. Thus, it becomes possible to calculate the phase difference amount by one-pixel unit of FIG. 3.

As described above, it becomes possible to calculate the in-focus position with high precision by dividing the phase difference detection area into plural areas and performing the correlative operation for each of the divided areas. However, since the correlative operation takes time, the increase of the division number serves as a factor of hindering the speed up of AF.

Therefore, in the present embodiment, in a case in which it may be determined that the AF precision is high even if the pixel addition of the phase difference detection pixels is performed by setting the phase difference detection areas 40 as one area without dividing the phase difference detection area 40 based on the status of the subject, the in-focus position is calculated by obtaining an optimum value. And the optimum value is obtained by performing the pixel addition on the phase difference detection pixels 1x and 1y within the phase difference detection area 40 in the vertical direction and performing the correlative operation on the curve X of FIG. 4 for the addition signals of the pixels 1x and the curve Y of FIG. 4 for the addition signals of the pixels 1y. Accordingly, the speed-up of the AF operation is facilitated.

Also, in a case in which it is believed that it is desirable to divide the phase difference detection area 40 in order to improve the AF precision depending on the status of the subject, the in-focus position is calculated by the method described in FIG. 5.

Figure 6:
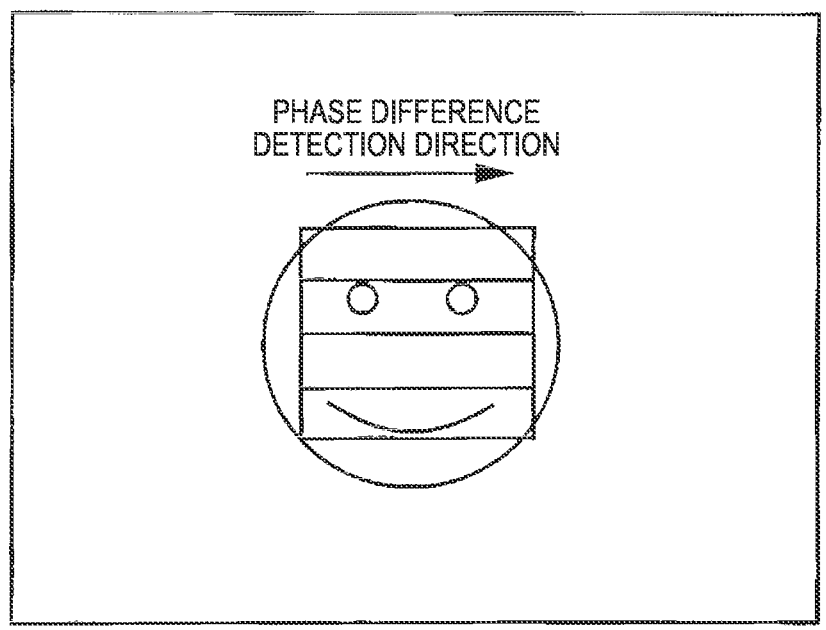
FIG. 6 is an explanatory view of a case in which a face image is detected as a subject.
Figure 7:
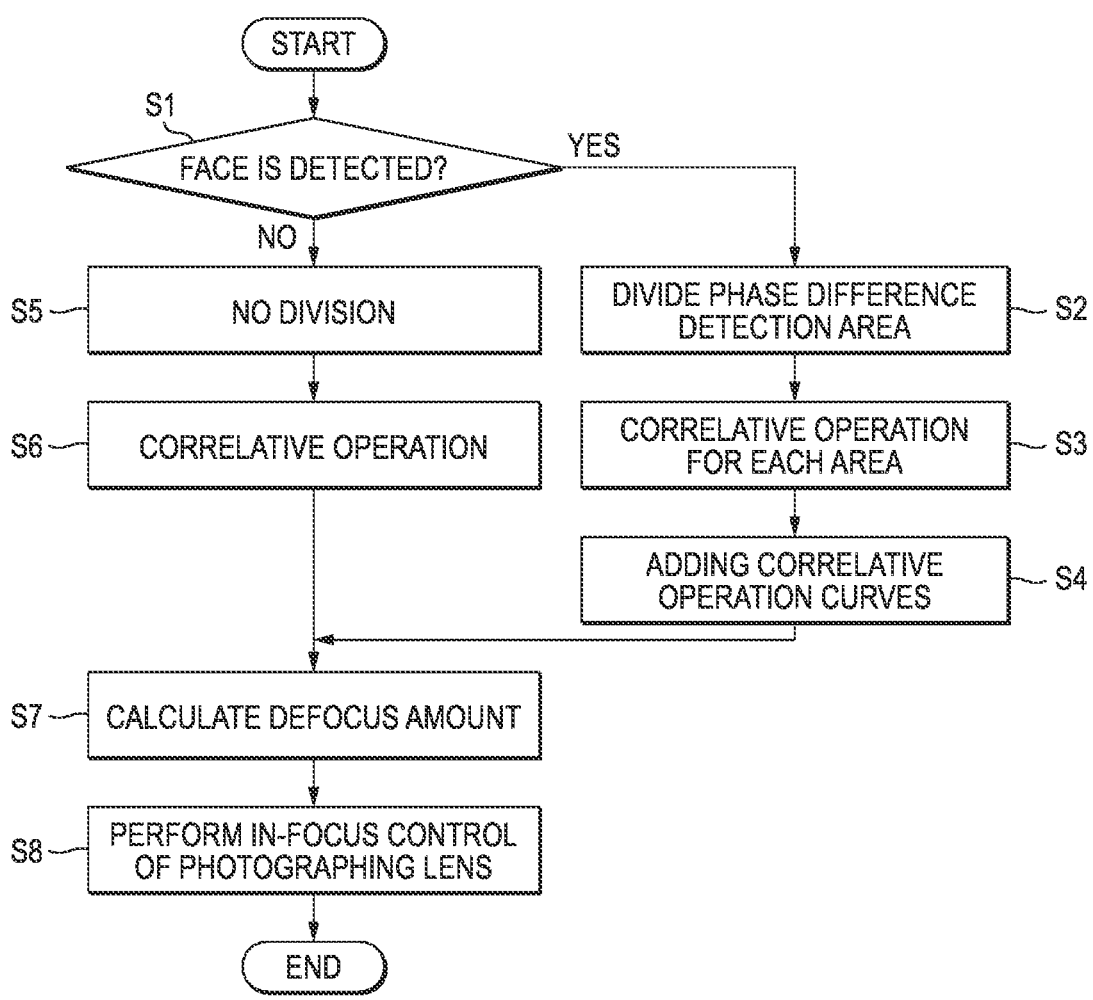
FIG. 7 is an explanatory view of a processing sequence of conducting case classification of an AF process based on whether a face image exists in a subject or not.

FIG. 6 illustrates a case in which a face image is reflected in the phase difference detection area 40. A human face image is generally low frequency and it is difficult to focus thereon. Therefore, in this case, it is desirable to divide the phase difference detection area 40 in order to increase the AF precision. FIG. 7 is a flowchart illustrating a processing sequence that the CPU 29 conducts. When the AF operation starts, it is determined whether the face is detected or not in step S1 firstly. In a case in which the face is detected, step S1 proceeds to step S2 and the phase difference detection area 40 is divided into plural areas. In the present example, it is divided into four.

Then, the evaluation curves I, II, III, IV are calculated for each of the divided areas by performing the correlative operation for each of the divided areas in the next step S3 and the total evaluation curve V is obtained by summating the evaluation curves I, II, III, IV for each of the divided areas in the next step S4.

Then, step S7 is followed in which an optimum evaluation value is obtained for the total evaluation curve V by performing the sub-pixel interpolation and the phase difference amount (defocus amount) that provides the optimum evaluation value is calculated. Then, an in-focus control is performed by controlling the position of the focus lens in the next step S8 and the processing is terminated.

In a case in which the face image is not detected as a result of the determination of step S1, step S1 is followed by step S5 and the phase difference detection area 40 is handled as one area without being divided. In step S6, the correlative operation is performed on the curve X of FIG. 4 obtained for the phase difference detection pixels 1x added in the phase difference detection area 40 and the curve Y of FIG. 4 obtained for the phase difference detection pixels 1y added in the phase difference detection area 40. Then, the defocus amount is calculated (step S7) based on the total evaluation curve obtained as a result of the correlative operation and the in-focus control of the focus lens is performed (step S8).

According to the present embodiment, the phase difference detection area 40 is divided to increase the AF precision in a case in which the face image is detected and it becomes possible to facilitate the speed-up of the AF operation without dividing the phase difference detection area 40 in a case in which the face image is not detected.

Figure 8:
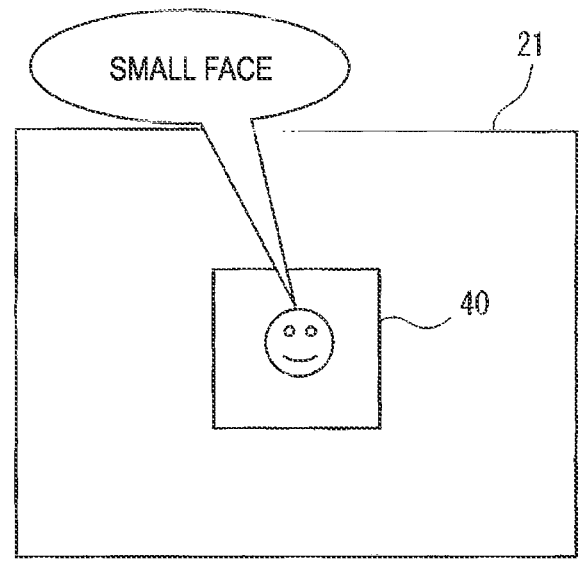
FIG. 8 is an explanatory view of a case in which a face image in a subject is small when compared to the area of a phase difference detection area.
Figure 9:
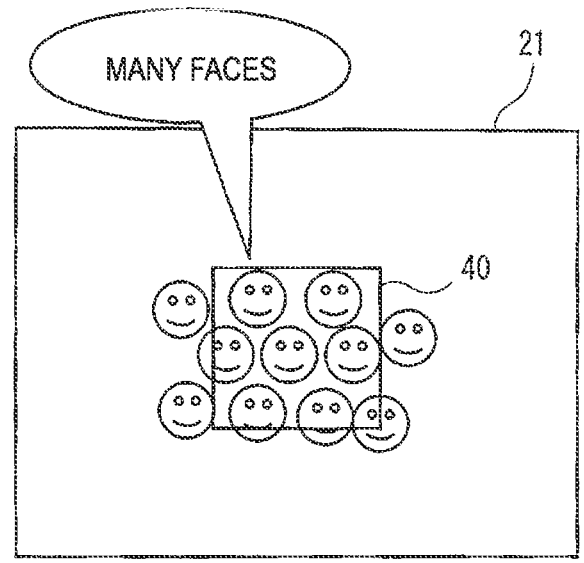
FIG. 9 is an explanatory view of a case in which face images of a group photo exist in a subject.

In addition, even a face image, for example, when the face image is smaller than the phase difference detection area 40 as illustrated in FIG. 8, it is easy to detect the in-focus position, since high-frequency components increase. Also, in a case of a group photograph where a lot of small faces exist near the phase difference detection area 40 as illustrated in FIG. 9, it is easy to detect the in-focus position since high-frequency components increase. For this reason, it becomes possible to secure the AF precision even when step 1 proceeds to step S5 and step S6 with one area without dividing the phase difference detection area 40. Therefore, a step that determines the status of FIG. 8 and FIG. 9 may be inserted between step S1 and step S2 to perform case classification as to whether to divide the phase difference detection area 40 or not based on the presence/absence of face(s), the size the face(s), and the number of faces that are the main subjects.

Figure 10:
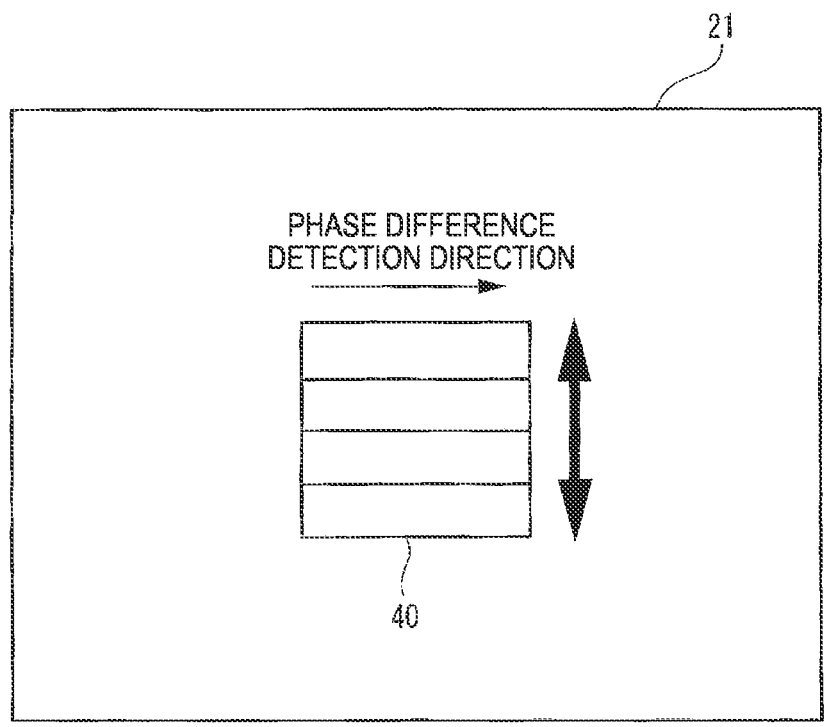
FIG. 10 is an explanatory view of a case in which a vertical contrast in a subject exists.
Figure 11:
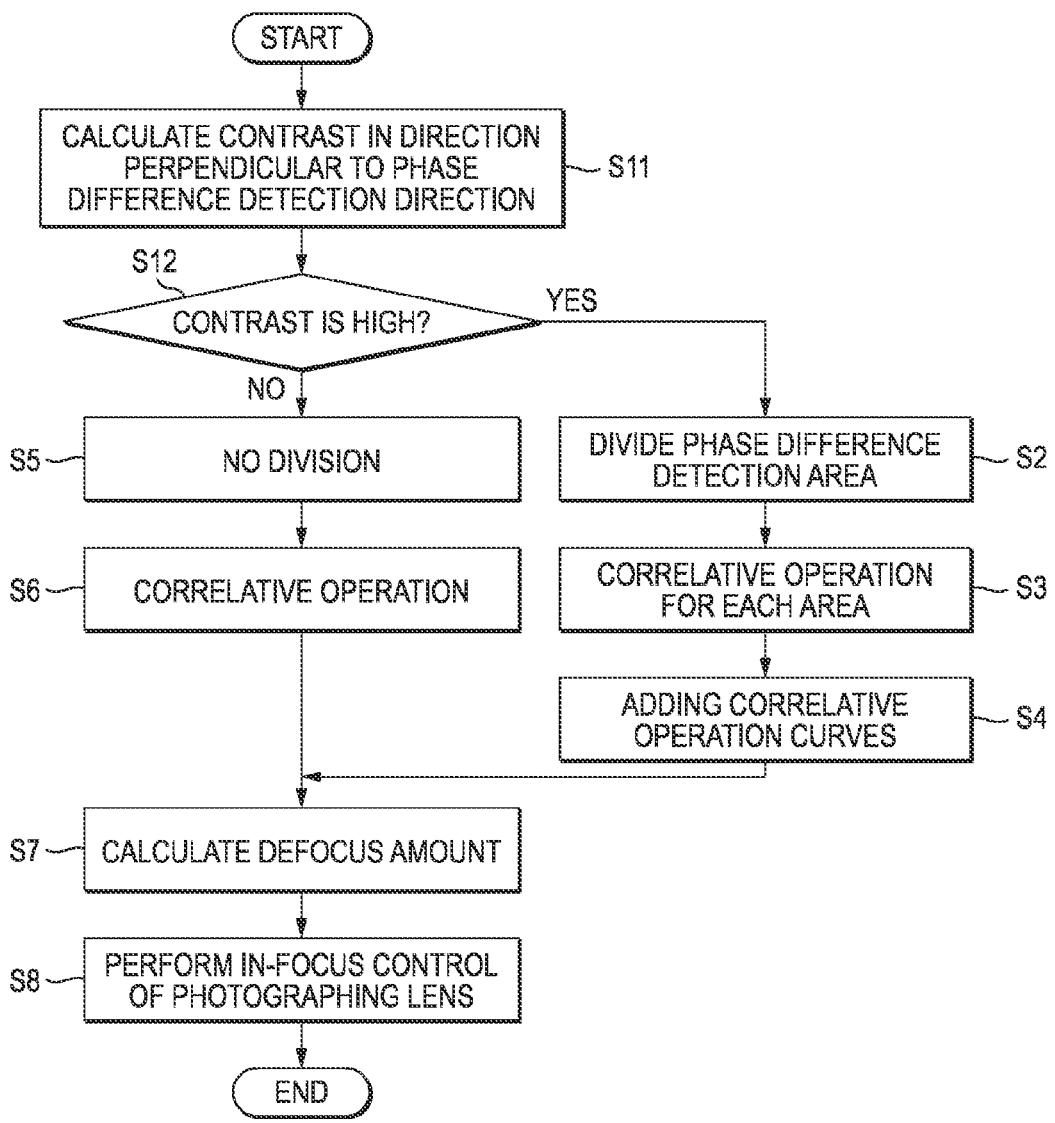
FIG. 11 is a flowchart illustrating a processing sequence of conducting case analysis based on the presence/absence of a vertical contrast of a subject.

FIG. 10 illustrates a case in which the contrast of a subject in the up-and-down direction (in a direction perpendicular to the phase difference detection direction) reflected on the phase difference detection area 40 is high, and FIG. 11 is a flowchart illustrating a processing sequence of case classification based on the height of contrast in the direction perpendicular to the phase difference detection direction. Here, the contrast is a value indicating the height of contrast within the phase difference detection area 40 which is determined by, for example, a value obtained by extracting a high-frequency component from the captured image signal through a high pass filter. Also, the processing steps that are the same as the processing steps of FIG. 7 are assigned with the same step numbers and the detailed descriptions thereof will be omitted.

At first, when the AF operation starts, the contrast is calculated in the direction perpendicular (right angles) to the phase difference detection direction in step S11 and then it is determined whether the contrast calculated in step S11 is higher than a critical value or not in the next step S12. In a case in which the contrast is higher, step S2 is followed and the phase difference detection area 40 is divided. In a case in which the contrast is lower, step S5 is followed and the phase difference detection area 40 is handled as one area without being divided. The following processing sequence is the same as that of FIG. 7.

In a case in which the contrast in the vertical direction of the phase difference detection area 40 is high, if the pixel addition is performed on all of the phase difference detection pixels 1x, 1y by setting the phase difference detection area 40 as one area, the patterns of the subject after the addition are equalized and the difference in contrast is not reflected. Therefore, it is not possible to obtain a high evaluation price.

Therefore, in the present embodiment, in the case in which the contrast of the vertical direction is high, step S2 is followed. In step S2, the phase difference detection area 40 is divided and the influence of the noise is reduced, thereby enhancing the AF precision. Meanwhile, in the case in which the contrast of the vertical direction is low, the evaluation curve is obtained without dividing the phase difference detection area 40, thereby promoting the speed-up of the AF operation.

Figure 12:
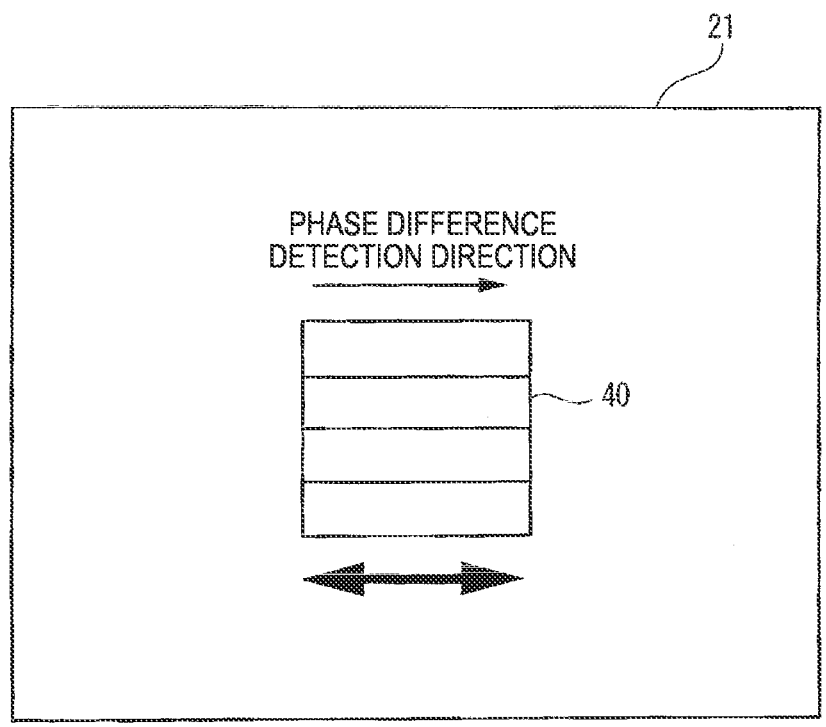
FIG. 12 is an explanatory view of a case in which a horizontal contrast in a subject exists.
Figure 13:
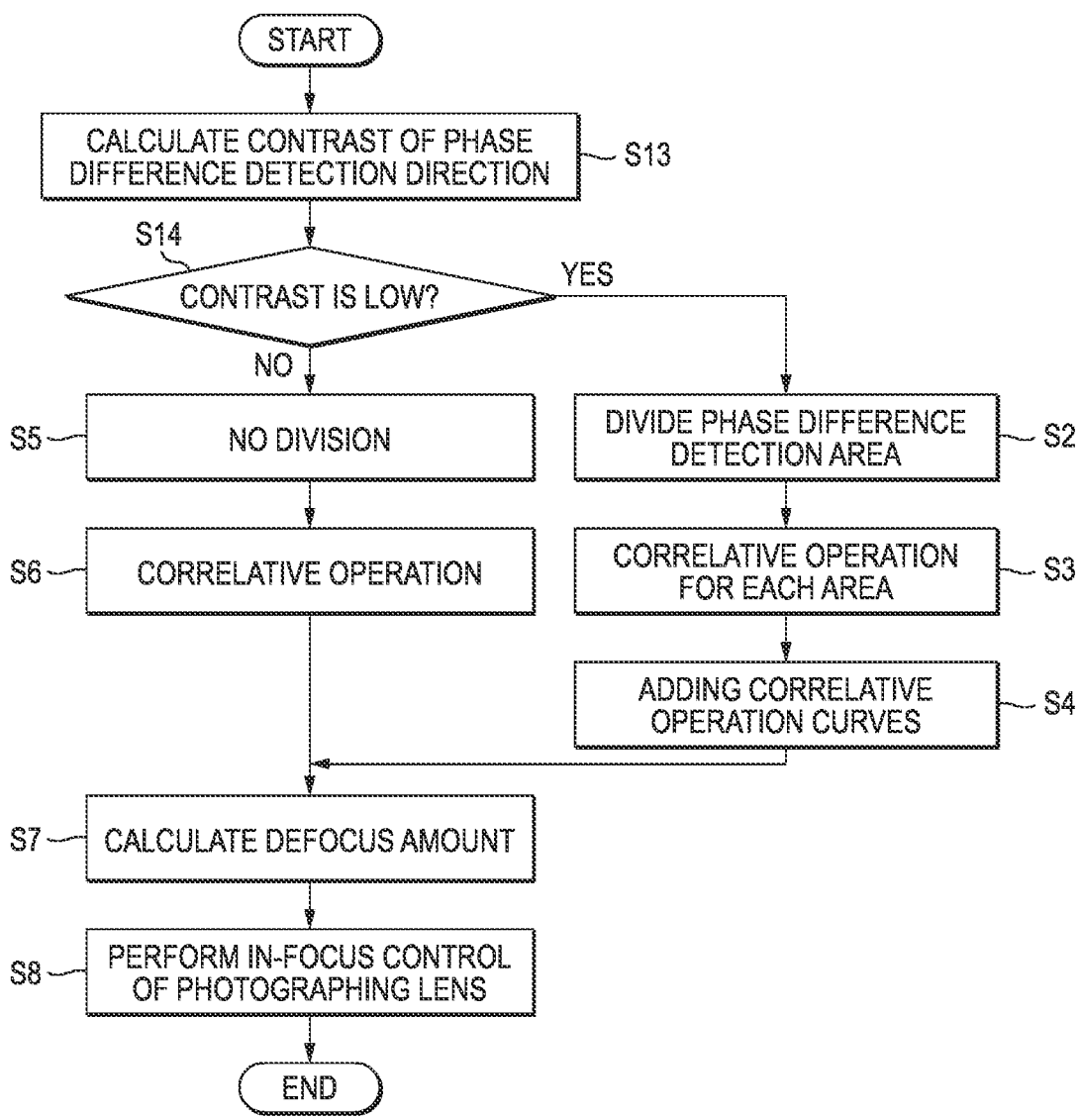
FIG. 13 is a flowchart illustrating a processing sequence of conducting case analysis based on the presence/absence of a horizontal contrast of a subject.

FIG. 12 illustrates a case in which the contrast in the left-and-right direction (the direction that is the same as the phase difference detection direction) of the subject reflected in the phase difference detection area 40 is high and FIG. 13 is a flowchart illustrating a processing sequence of case classification based on the height of contrast in the phase difference detection direction. Also, the processing steps that are the same as the processing steps of FIG. 7 are assigned with the same step numbers and the detailed descriptions thereof will be omitted.

In the present embodiment, the contrast of the phase difference detection direction is calculated in step S13 at first. And, in the next step S14, it is determined whether the contrast is lower than a critical value or not. In a case in which the contrast of the left and the right direction is lower than the critical value, step S2 is followed to increase the AF precision and in a case in which the contrast is higher than the critical value, step S5 is followed to facilitate the speed-up of the AF operation. The sequence of processes hereafter is the same as that of FIG. 7.

If the contrast is high in the same direction as the phase difference detection direction, the form of the curve X and the curve Y of FIG. 4 becomes a clear form and the calculation of a deviation amount between both of them becomes easy. Thus, when the contrast of the phase difference detection direction is high, the speed-up of the AF operation is facilitated without conducting the division of the phase difference detection area. In a case in which the processings of FIG. 11 and FIG. 13 are used together, it is desirable to configure the processings such that determination is made based on the contrast of the vertical direction when the contrast of the horizontal direction is low.

Figure 14:
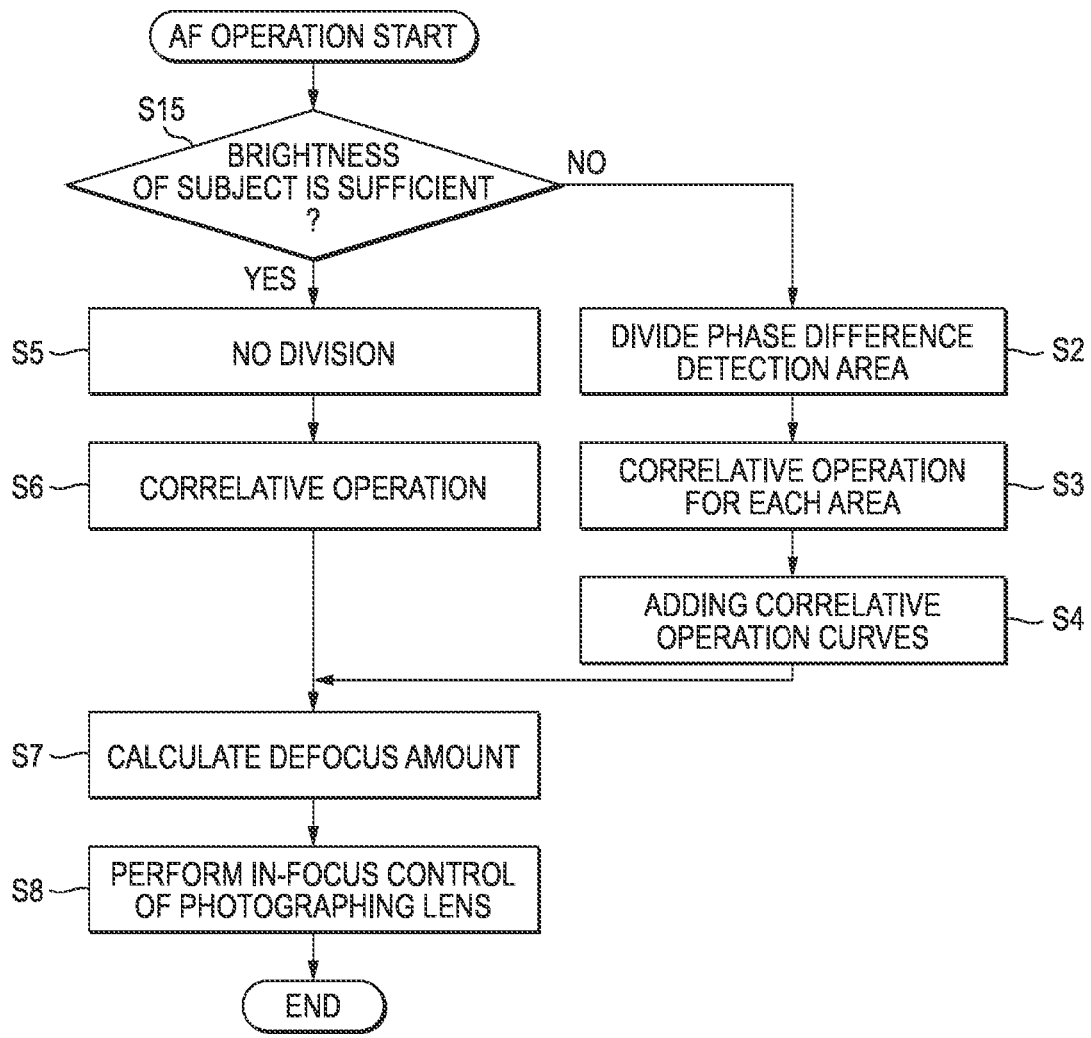
FIG. 14 is a flowchart illustrating a processing sequence according to another embodiment of the present invention.

FIG. 14 is a flowchart illustrating a processing sequence of another embodiment of the present invention. Also, the processing steps that are the same as the processing steps of FIG. 7 are assigned with the same step numbers and the detailed descriptions thereof will be omitted.

In the present embodiment, when the AF operation starts, it is determined whether the brightness of the subject is brighter than a critical value or not at first (step S15). In a case in which the subject is bright, it is easy to exhibit the AF precision since there is enough exposure. Also, in a case in which the subject is dark, it is difficult to exhibit the AF precision. Therefore, step S2 is followed in which the area is divided in a case in which the brightness of the subject is low. Also, step S5 is followed and the speed-up of the AF operation is facilitated by setting the phase difference detection area 40 as one area in a case in which the brightness of the subject is bright. The following processing sequence is the same as that of FIG. 7.

Figure 15:
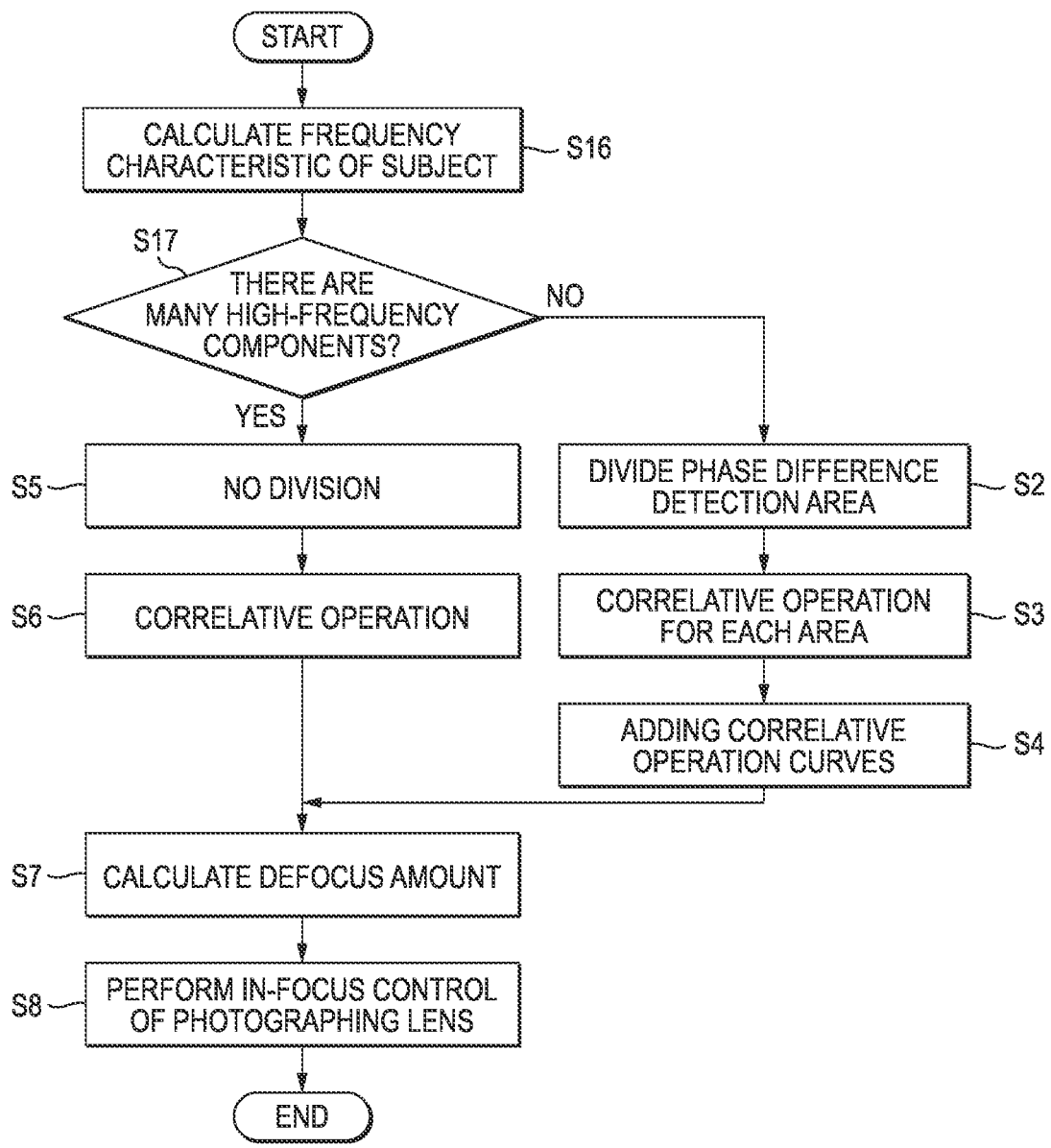
FIG. 15 is a flowchart illustrating a processing sequence according to another embodiment of the present invention.

FIG. 15 is a flowchart illustrating a processing sequence another embodiment of the present invention. Also, the process steps that are the same as the processing steps of FIG. 7 are assigned with the same step numbers and the detailed descriptions thereof will be omitted.

In the present embodiment, when the AF operation starts, the frequency characteristic of a subject image is calculated at first in step 16. Then, it is determined whether there are many high-frequency components or not in the next step S17 and then in a case in which a few high frequency components exist, step S2 is followed to obtain the AF precision. Step S5 is followed to conduct the high speed AF since enough AF precision may be achieved with one area in a case in which many high frequency components exist. The following processing sequence is the same as that of FIG. 7.

As exemplified in FIG. 3, in a case of an image sensor which has both the phase difference detection pixels 1x, 1y and normal pixels that capture a subject image, the frequency that the normal pixels may recognize is higher than the frequency that the phase difference detection pixels may recognize since the density of the normal pixels is generally high. Case classification as to whether step S2 is followed or step S5 is followed is made based on the frequency of the subject image which is detected by the normal pixels. As a result, it becomes possible to conduct the AF with high speed and high precision even for a subject having many high frequency components.

As in the above-described embodiments, it becomes possible to obtain AF performance with high speed or high precision to an extent which is the same as that of the single lens reflex camera even if an image capturing element with a small area is used since it is determined whether to handle the phase difference detection area as one area or divide into plural areas based on the status of the subject and then the speed-up of AF process is facilitated without dividing in a case in which the AF precision is expected with one area and the phase difference AF processing is performed by dividing the phase difference detection area when the AF precision is not expected.

In addition, although the description has been made by using an example in which the light shielding apertures are formed to be small as pupil-divided pair-pixels forming the phase difference detection pixels and disposed to be offset in the opposite directions in the above-described embodiments, the method to form the phase difference detection pixels by pupil-dividing is not limited thereto. For example, a pair-pixel may be pupil-divided by installing a micro lens thereon.

Also, in the above-described embodiments, although the detection of the in-focus position by the phase difference AF method in which the phase difference detection area is divided into plural areas and the detection of the in-focus position by the phase difference AF method in which the phase difference detection area is not divided (that is, the division number is "1") are separated based on the status of a subject, the division number may be changed based on the status of the subject. For example, whether to set the division number as "2" or "4" may be separated based on the status of the subject. If the division number is reduced, the correlative operation processings are reduced and the AF processing with high speed is enabled.

Further, although the total evaluation curve is obtained by adding all the divided area evaluation curves in the above-described embodiments, there is no need to target all the divided area evaluation curves as objects to be added. A divided area evaluation curve which is not reliable or a divided area evaluation curve which has a position of the minimum value (maximum evaluation value) largely different from that of other divided area evaluation curves may be excluded and the required operation processing (addition processing in the embodiments) may be performed only on the evaluation curves of the plural areas the reliability of which is higher than a critical value.

Further, although the description has been made about an example of calculating "addition total" as a required operation processing in a case in which the total (or plural area) evaluation curve is obtained by carrying out a required operation processing for correlative operation curves for respective areas in the above-described embodiments, another value such a "mean value" or a "multiplication value" may be obtained.

Further, although the descriptions have been made about an example in which pair-pixels that detect the phase difference are installed at discrete and periodic positions in the above-described embodiments, the pair-pixels are not necessarily installed at the periodic and discrete positions and may be at random positions (even if the phase difference detection pixels installed in the same row are at the random positions, the curves X, Y may be calculated). Also, all the pixels may be set as phase difference detection pixels.

An image capturing apparatus and an in-focus position detection method of the embodiments discussed above is characterized by comprising: an image capturing element where pair-pixels each configured by a first phase difference detection pixel and a second phase difference detection pixel that are pupil-divided are arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control means that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, wherein the control means includes: a means that determines whether to set a division number into which the phase difference detection area is divided in a direction perpendicular to the detection direction of the phase difference to a first division number n or to a second division number m which is larger than n based on the status of the subject, a means that calculates a correlative operation curve for each divided area by calculating a correlation between the first detection information and the second detection information for each of the divided areas formed by dividing the phase difference detection area into the n or the m, and a means that acquires a defocus amount to drive and control the focus lens to the in-focus position from a total evaluation curve obtained by conducting a required calculation processing on the correlative operation curves of the plural divided areas.

And, the image capturing apparatus and the in-focus position detection method of the embodiments are characterized in that the first division number n includes 1 and the correlative operation curve of the divided area when n=1 is set as the correlative operation curve of the plural divided areas.

And, the image capturing apparatus and the in-focus position detection method of the embodiments are characterized in that the status of the subject is determined by a spatial frequency characteristic of a subject image, so that when the subject has high frequency components more than a critical value, the first division number n is selected and when the subject has the high frequency components less than the critical value, the second division number m is selected.

And, the image capturing apparatus and the in-focus position detection method of the embodiments are characterized in that the status of the subject is determined based on the presence/absence of a face image, so that when the face image does not exist, the division number n is selected and when the face image exists, the second division number m is selected.

And, the image capturing apparatus and the in-focus position detection method of the embodiments are characterized in that the status of the subject is determined an image size of a main subject, so that when the main subject is smaller than a critical value for the phase difference detection area, the first division number n is selected and when the main subject is larger than the value, the second division number m is selected.

And, the image capturing apparatus and the in-focus position detection method of the embodiments are characterized in that the status of the subject is determined based on a contrast value in a direction perpendicular to a phase difference detection direction of the phase difference detection area, so that when the contrast value is small, the first division number n is selected and when the contrast value is large, the second division number m is selected.

And, the image capturing apparatus and the in-focus position detection method of the embodiments are characterized in that the status of the subject is determined based on a contrast value in a phase difference detection direction of the phase difference detection area, so that when the contrast value is large, the first division number n is selected and when the contrast value is small, the second division number m is selected.

And, the image capturing apparatus and the in-focus position detection method of the embodiments are characterized in that the status of the subject is determined based on the brightness of the subject, so that when the brightness of the subject is brighter than a value, the first division number n is selected and when the brightness of the subject is darker than the value, the division number m is selected.

According to the above-described embodiments, it becomes possible to implement high-speed AF and high precision AF that are equivalent to those of a single lens camera by the phase difference AF method regardless of the status of a subject.

INDUSTRIAL APPLICABILITY

An in-focus position detection method according to the present invention is useful when it is applied to, for example, a digital camera, especially a compact digital camera, a camera-installed portable phone, a camera-installed electronic device, and an image capturing element for an endoscope since a high speed and high precision AF performance may be obtained regardless of the status of a subject.

The present application is based on Japanese Patent Application No. 2010-267933 filed on Nov. 30, 2010 and the disclosure thereof is incorporated herein in its entirety by reference.

REFERENCE SIGNS LIST 1x, 1y: phase difference detection pixel
2x, 2y: light shielding film aperture of phase difference detection pixel
10: image capturing apparatus
20: photographing lens
21: solid state image capturing element
24: driving unit
26: digital signal processing unit
29: system control unit
40: phase difference detection area
I, II, III, IV: divided area

The invention claimed is:
1. An image capturing apparatus comprising:
an image capturing element where pair-pixels each configured by a first phase difference detection pixel and a second phase difference detection pixel that are pupil-divided are arranged two-dimensionally in a phase difference detection area provided on a light receiving surface that captures an image of a subject;
a focus lens that is disposed at the front end of a light path of the image capturing element and forms an optical image which is in-focus on the subject on the light receiving surface; and
a control unit that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, wherein the control unit includes:
a determination unit that determines whether to set a division number into which the phase difference detection area is divided in a direction perpendicular to the detection direction of the phase difference to a first division number n or to a second division number m which is larger than n based on the status of the subject,
a calculation unit that calculates a correlative operation curve for each divided area by calculating a correlation between the first detection information and the second detection information for each of the divided areas formed by dividing the phase difference detection area into the n or the m, and
a defocus amount calculation unit that acquires a defocus amount to drive and control the focus lens to the in-focus position from a total evaluation curve obtained by conducting a required calculation processing on the correlative operation curves of the plural divided areas,
wherein the status of the subject is determined based on a spatial frequency characteristic of a subject image, so that when the subject has high frequency components more than a critical value, the first division number n is selected and when the subject has the high frequency components less than the critical value, the second division number m is selected.

2. The image capturing apparatus of claim 1, wherein the first division number n includes 1 and the correlative operation curve of the divided area when n=1 is set as the correlative operation curve of the plural divided areas.

3. An in-focus position detection method of an image capturing apparatus that includes an image capturing element where a pair-pixel configured by a first phase difference detection pixel and a second phase difference detection pixel that are pupil-divided is arranged two-dimensionally in a phase difference detection area provided on a light receiving surface that captures an image of a subject; a focus lens that is disposed at the front end of a light path of the image capturing element and forms an optical image which is in-focus on the subject on the light receiving surface; and a control unit that calculates a phase difference between a first distribution curve of first detection information output from the first phase difference detection pixel in relation to one side arrangement direction of the pair-pixel and a second distribution curve of second detection information output from the second phase difference detection pixel in relation to the one side arrangement direction and drives and controls the focus lens to the in-focus position based on the phase difference, wherein the method comprises:
determining whether to set a division number into which the phase difference detection area is divided in a direction perpendicular to the detection direction of the phase difference to a first division number n or to a second division number m which is larger than n based on the status of the subject,
calculating a correlative operation curve for each divided area by calculating a correlation between the first detection information and the second detection information for each of the divided areas formed by dividing the phase difference detection area into the n or the m, and
acquiring a defocus amount to drive and control the focus lens to the in-focus position from a total evaluation curve obtained by conducting a required calculation processing on the correlative operation curves of the plural divided areas,
wherein the status of the subject is determined by a spatial frequency characteristic of a subject image, so that when the subject has high frequency components more than a critical value, the first division number n is selected and when the subject has the high frequency components less than the critical value, the second division number m is selected.

* * * * *